B. HESS.
AMUSEMENT APPARATUS.
APPLICATION FILED FEB. 12, 1916.
1,182,682.
Patented May 9, 1916.
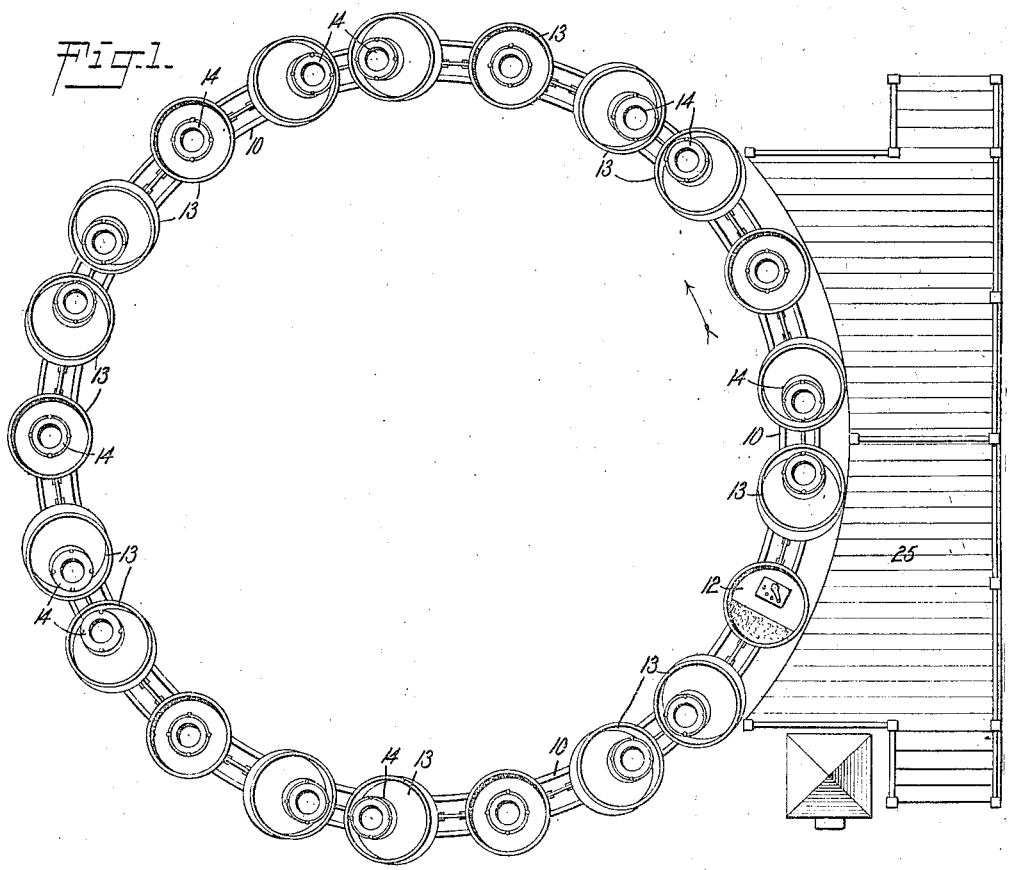
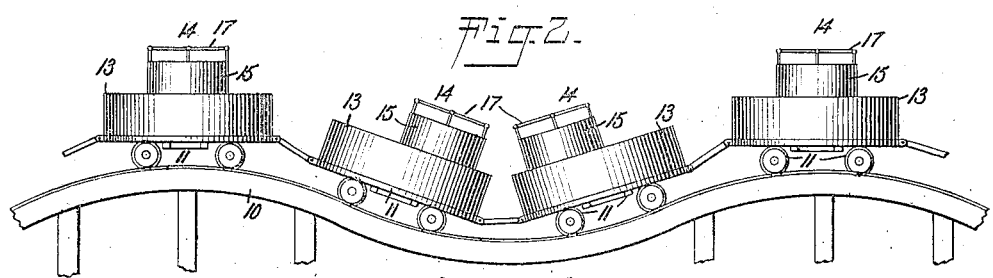
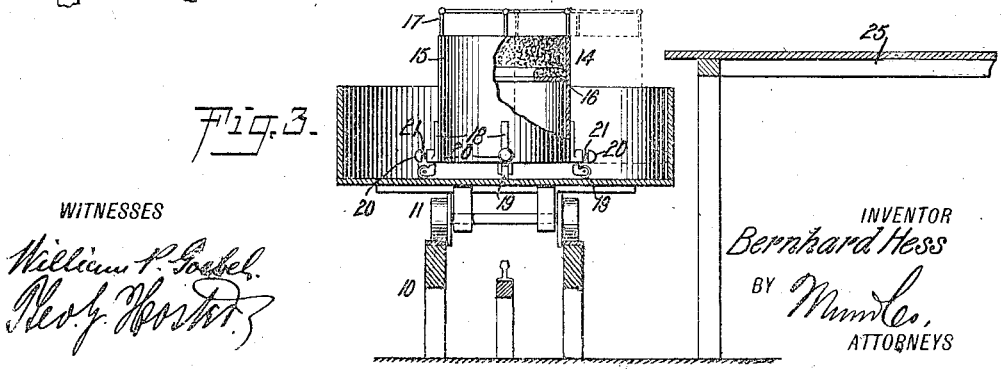
WITNESSES
INVENTOR
Bernhard Hess
BY
ATTORNEYS

UNITED STATES PATENT OFFICE.

BERNHARD HESS, OF NEW YORK, N. Y.

AMUSEMENT APPARATUS.

1,182,682.  Specification of Letters Patent.  Patented May 9, 1916.

Application filed February 12, 1916. Serial No. 77,899.

*To all whom it may concern:*

Be it known that I, BERNHARD HESS, a subject of the German Emperor, and a resident of the city of New York, borough of Manhattan in the county and State of New York, have invented a new and Improved Amusement Apparatus, of which the following is a full, clear, and exact description.

The object of the invention is to provide a new and improved amusement apparatus, more especially designed for use in amusement parks, exhibition grounds and other places, and arranged to afford passengers an exceedingly interesting and exciting ride.

In order to accomplish the desired result, use is made of an undulating track, a truck mounted thereon and supporting a circular box open at the top, and a passenger car body mounted to travel freely in the said circular box by its own weight and in a direction according to the inclination of the truck on the said undulating track.

A practical embodiment of the invention is represented in the accompanying drawings forming a part of this specification, in which similar characters of reference indicate corresponding parts in all the views.

Figure 1 is a plan view of the amusement apparatus; Fig. 2 is an enlarged side elevation of a portion of the same; and Fig. 3 is an enlarged cross section through the platform.

The railroad track 10 of the amusement apparatus is made endless and is undulating throughout its entire length, and on this track 10 is mounted to travel an endless train of trucks 11 propelled around the track by any suitable propelling means, such, for instance, as shown in Fig. 1, consisting of an electric or other locomotive interposed between adjacent trucks 11 of the train. It is understood, however, that other suitable means such as are used in merry-go-rounds may be used for propelling the trucks around the track. On each truck 11 is mounted a circular box 13 open at the top and containing a passenger car 14, the body 15 of which is preferably circular and provided with seats 16 for the passengers and a railing 17 for the passengers to hold on if desired. The body 15 of the passenger car 14 is provided at its lower end with brackets 18 in which are journaled wheels 19 traveling on the floor of the box 13. Each of the brackets 18 is also provided with a bumper 20 held in an outward position by a spring 21 and adapted to bump against the inner surface of the rim of the box 13 to release the passenger car 14 of undue jolts or jars and at the same time cause the passenger car to rebound from the rim of the box 13.

It will be noticed that by the arrangement described, the passenger car 14 is free to travel on the floor of the box 13, and as the truck 11 travels over the undulating track 10, it is evident that the floor of the box 13 is inclined upwardly and forwardly when going up the track and inclined downwardly and forwardly on going down a corresponding portion of the track. Thus the passenger car 14 besides being bodily carried forward in the box 13 is tilted and has a traveling motion of its own in various directions. In addition to this movement of the car must be added the bumping and rebounding action of the car against the rim of the box body, and each rebounding action has a tendency to turn the car on its own axis, so that the passengers in the car enjoy an exceedingly interesting and exciting ride.

A loading and unloading platform 25 is arranged adjacent to the outer side of the track 10 to permit the passengers to conveniently enter the cars 15 for beginning the ride and leaving the cars after the ride is completed. It is understood that the entire train is run around the track for a certain length of time and is then stopped for the passengers to leave the cars and to allow another batch of passengers to board the cars 14 of the train.

Having thus described my invention, I claim as new and desire to secure by Letters Patent:

1. An amusement apparatus, comprising an undulating track, a truck mounted thereon, a circular box open at the top and mounted on the said truck, and a passenger car body mounted to travel freely in the said circular box by its own weight and in a direction according to the inclination of the truck on the said undulating track.

2. An amusement apparatus, comprising an undulating track, a truck mounted thereon, a circular box open at the top and mounted on the said truck, a passenger car body mounted to travel freely in the said circular box by its own weight and in a direction according to the inclination of the truck on the said undulating track, and rebounding means exteriorly on the passenger car and adapted to bump against the rim of the box.

3. An amusement apparatus, an endless undulating track, a truck mounted to travel on the said track, means for propelling the said truck, a circular box mounted on the said truck and open at the top, and a circular passenger car open at the top, wheels supporting the car and adapted to travel on the floor of the said box, and rebounding means mounted on the said passenger car and projecting a distance beyond the outer side of the passenger car.

4. An amusement apparatus, an endless undulating track, a truck mounted to travel on the said track, means for propelling the said truck, a circular box mounted on the said truck and open at the top, a circular passenger car open at the top, wheels supporting the car and adapted to travel on the floor of the said box, brackets attached to the car and in which the said wheels are journaled, the brackets and wheels extending beyond the exterior of the car, and spring-pressed bumpers mounted on the said brackets and extending outwardly beyond the said wheels to produce a rebound action on striking the rim of the box.

In testimony whereof I have signed my name to this specification in the presence of two subscribing witnesses.

BERNHARD HESS.

Witnesses:
 THEO. G. HOSTER,
 GEORGE H. EMSLIE.